US007692078B2

(12) United States Patent
Hayashi et al.

(10) Patent No.: US 7,692,078 B2
(45) Date of Patent: Apr. 6, 2010

(54) KEY ACTUATING APPARATUS AND KEY ACTUATION CONTROL SYSTEM

(75) Inventors: Yoshinori Hayashi, Iwata (JP); Hideo Suzuki, Hamamatsu (JP); Emiko Suzuki, legal representative, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/896,598

(22) Filed: Sep. 4, 2007

(65) Prior Publication Data

US 2008/0083314 A1    Apr. 10, 2008

(30) Foreign Application Priority Data

Sep. 6, 2006    (JP)    ............ P 2006-241791

(51) Int. Cl.
*G10F 1/02*    (2006.01)
(52) U.S. Cl. .................................. 84/22; 310/800
(58) Field of Classification Search ............... 84/22, 84/20, 21; 310/800
See application file for complete search history.

(56) References Cited

U.S. PATENT DOCUMENTS 5,276,270 A * 1/1994 Kondo ..................... 84/22

7,342,350 B2 * 3/2008 Toda ....................... 310/334
2004/0232807 A1 * 11/2004 Pelrine et al. ............. 310/800
2006/0072181 A1 4/2006 Goossens

FOREIGN PATENT DOCUMENTS

| JP | 4-204697 A | | 7/1992 |
|----|------------|---|--------|
| JP | 06222752 A | * | 8/1994 |
| JP | 7-111631 B | | 11/1995 |
| JP | 2000-276164 A | | 6/2000 |
| JP | 2002-023758 A | | 1/2002 |
| KR | 94-10863 U | | 5/1994 |
| KR | 10-2005-0085915 A | | 8/2005 |

OTHER PUBLICATIONS

Notice of Allowance, the Korean Intellectual Property Office, Application No. 10-2007-0088950, May 29, 2009.

* cited by examiner

*Primary Examiner*—Jianchun Qin
(74) *Attorney, Agent, or Firm*—Smith Patent Office

(57) ABSTRACT

In order to realize a small and light key actuating apparatus for actuating a key which is rotatably supported with respect to a frame, a key actuating apparatus (7) is provided which includes a polymer transducer (9) for rotatably moving the key (3) by using a deformation of the transducer, wherein the transducer which is substantially formed in a plate shape includes: a polymer film (15) which is dielectric and made from an elastically deformable polymer material; and a pair of electrodes (17) arranged at both sides of surfaces of the polymer film, and the transducer is deformed corresponding to switching between an application of voltage and a lack of voltage between the electrodes.

1 Claim, 8 Drawing Sheets

KEY ACTUATING APPARATUS AND KEY ACTUATION CONTROL SYSTEM

BACKGROUND OF THE INVENTION

1. Field of the Invention

The present invention relates to a key actuating apparatus and a key actuation control system.

Priority is claimed on Japanese Patent Application No. 2006-241791, filed Sep. 6, 2006, the content of which is incorporated herein by reference.

2. Description of Related Art

In general, a natural keyboard musical instrument such as an acoustic piano has a constitution in which, for example, a natural sound is generated by hitting a string with a rotatably movable hammer when a key is pushed. Such the natural keyboard musical instrument has an action mechanism between the key and the hammer. The action mechanism affects a special reacting force (braking force of the key) on a player via the key. In other words, the natural keyboard musical instrument has its own touch of the key.

On the other hand, a conventional electric keyboard musical instrument such as an electric keyboard which generates an electric sound has a spring for returning the key to an initial position. The conventional electric keyboard musical instrument has a constitution in which, the player operates the key while acting against the reacting force of the spring upon pushing the key. Therefore, the resistance of the key of the electric keyboard musical instrument is obtained by using a simple returning force of the spring and is greatly different from the resistance of the key of the natural keyboard musical instrument.

There is prior art (for example, Patent Document 1 (Japanese Unexamined Patent Application, First Publication No. H04-204697) and Patent Document 2 (Japanese Examined Patent Application, Second Publication No. H07-111631)) which have an object to obtain the same resistance of the key as the natural keyboard musical instrument with the action mechanism even by using the electric keyboard musical instrument. In the prior art, a key actuating apparatus which applies a reacting force against a pushing force on the key by actuating the key is proposed. In the prior arts, a key actuating apparatus which is an electromagnetic actuator of a solenoid type is used. Other than a function of applying the reacting force, the keyboard musical instrument of the prior art has a function of autonomous playing in which keys are operated by the key actuating apparatus in accordance with operation information corresponding to a set of sounds constituting music.

In the Patent Documents 1 and 2, the key actuating apparatus has the electromagnetic actuator of the solenoid type. Therefore, there is a problem in which the key actuating apparatus is large and heavy. This problem is especially critical because the electric keyboard musical instrument such as an electric keyboard has a great demand with regard to portability.

SUMMARY OF THE INVENTION

The present invention is conceived in order to solve the above-described problem and has an object to provide both a key actuating apparatus which is small and light and a key actuation control system including the key actuating apparatus.

In order to solve the above-described problem, for example, the present invention has the following aspects.

A first aspect is a key actuating apparatus which actuates a key rotatably supported with respect to a frame including a polymer transducer for rotatably moving the key by using a deformation of the polymer transducer, wherein the polymer transducer is substantially formed in a plate shape and includes: a polymer film which is dielectric and made from an elastically deformable polymer material; and a pair of electrodes arranged at both sides of surfaces of the polymer film, and the transducer is deformed corresponding to the application of switching voltage between the electrodes.

By using the above-described key actuating apparatus of the first aspect, if a voltage is applied to a pair of electrodes to which no voltage is initially applied, the polymer membrane is elastically deformed due to an electrostatic attraction caused between the electrodes, and the polymer membrane is extended along the surface direction. On the other hand, if application of the voltage is stopped, the polymer membrane is contracted in the surface direction due to the elastic force of the polymer membrane.

The polymer transducer is deformed or curved due to extension and contraction of the polymer membrane, and the key is rotatably moved due to such deformation and curve of the polymer transducer. That is, by using the above-described key actuating apparatus, it is possible to rotatably move the key corresponding to a state of applying voltage to a pair of electrodes. It should be noted that an actuating force for rotatably moving the key is generated from electrostatic attraction caused between a pair of the electrodes, elastic force of the polymer membrane, and the like.

A second aspect is preferably the above-described key actuating apparatus, further including: a laminated body which comprises the polymer film and the electrodes; and a plate shape member which has a higher elasticity than the polymer film, wherein the laminated body is fixed on at least one of a front side surface and a backside surface of the plate shaped member.

By using the above-described key actuating apparatus of the second aspect, it is possible to maintain a shape of the polymer transducer even if the polymer membrane has a low modulus of elasticity because the laminated body is fixed to be the plate shaped portion which has a higher modulus of elasticity than the polymer membrane.

Moreover, if a state of applied voltage is changed between the electrodes of the laminated body which are arranged at one of front side and back side of the plate shaped portion, only a front surface of the plate shaped portion is extended or coned along with the extension or contraction of the polymer membrane in a surface direction. In other words, the plate shape portion is deformed. Therefore, it is possible to reliably cause deformation on the polymer transducer.

A third aspect is preferably the above-described key actuating apparatus, wherein the polymer film is formed in a cylindrical shape, one of the electrodes facing the another electrode while the polymer film in-between is arranged on an inside surface of the cylindrically formed polymer film, and the other electrode is arranged on an outside surface of the cylindrically formed polymer film and covers a portion of an outside peripheral.

By using the above-described key actuating apparatus of the third aspect, if a state of applied voltage is changed between a pair of the facing electrodes which are arranged so as to cover a portion of circular shaped edges of the polymer membrane (for example, as shown in FIG. 8, one electrode covers a portion of the outside surface of the cylindrical polymer membrane along a length direction so as to cover a portion of an outside edge of a circular cross-section of the membrane, and another electrode is arranged at a center aperture of the cylindrical membrane), only a portion of the circular shaped edges of the polymer membrane (for example, curves in a direction along arrow C shown in FIG. 8) is deformed. Therefore, it is possible to reliably cause a deformation on the polymer transducer which is formed in a cylindrical shape.

A fourth aspect is preferably a key actuation control system including: the above-described key actuating apparatus a position detection unit detecting a position of the key while rotatably moving; a control unit actuating the key by controlling the applied voltage between the electrodes in order to cause a reaction force of the polymer transducer against the rotatably moving operation of the key when the position detection unit detects rotatable movement of the key due to a manual operation.

By using the above-described key actuation control system of the fourth aspect, if a rotatably moving operation on the key by a player's finger (pushing operation on the key) is detected, the key is actuated so as to rotatably move the key, by the polymer transducer in a direction opposite to a pushing direction of the key, and a reacting force against the pushing operation of the key is applied. Therefore, even by using an electric keyboard musical instrument, it is possible to obtain the same resistance as a natural keyboard musical instrument which provides an action mechanism.

Moreover, the reacting force is controlled in accordance with the voltage applied to a pair of the electrodes. Therefore, it is possible to accurately control the reacting force.

A fifth aspect is the above-described key actuation control system, wherein the position detection unit includes the polymer transducer, and a capacitance measurement portion measuring a capacitance between the electrodes, and the control unit controls the applied voltage between the electrodes based on the measured capacitance.

In the above-described key actuation control system, when the key is rotatably moved, the polymer transducer is deformed and an interval between a pair of the electrodes is changed because the polymer membrane is extended or contracted in the direction along the surface. There is a certain relationship between a position of the key while rotatably moving and an interval between the electrodes. Therefore, it is possible to detect the position of the key while rotatably moving.

In accordance with the above-described first aspect, it is possible to actuate the key by using the polymer transducer with a simple constitution in which a pair of the electrodes is arranged at both surfaces of the polymer membrane. Therefore, it is possible to provide a small and light electrical keyboard musical instrument which has a key actuating apparatus.

Moreover, compared to a conventional product, a constitution of the key actuating apparatus for actuating the key is simple and it is possible to easily reduce the cost for producing the key actuating apparatus because the key actuating apparatus is constituted from the polymer transducer with a simple structure.

In accordance with the above-described second and third aspects, it is possible to reliably cause a deformation on the polymer transducer.

In accordance with the above-described fourth aspect, the reacting force against a pushing operation on the key is controlled in accordance with the voltage applied between a pair of the electrodes. Therefore, it is possible to accurately control the reacting force, and it is possible to obtain the same resistance as a natural keyboard musical instrument even when playing an electric keyboard musical instrument.

In accordance with the above-described fifth aspect, the same polymer transducer has both a function of a key actuating apparatus and a position detection unit. Therefore, it is possible to reduce a number of constitutional elements of the key actuation control system and to further reduce the cost for producing the key actuation control system.

DETAILED DESCRIPTION OF THE INVENTION

Figure 1:
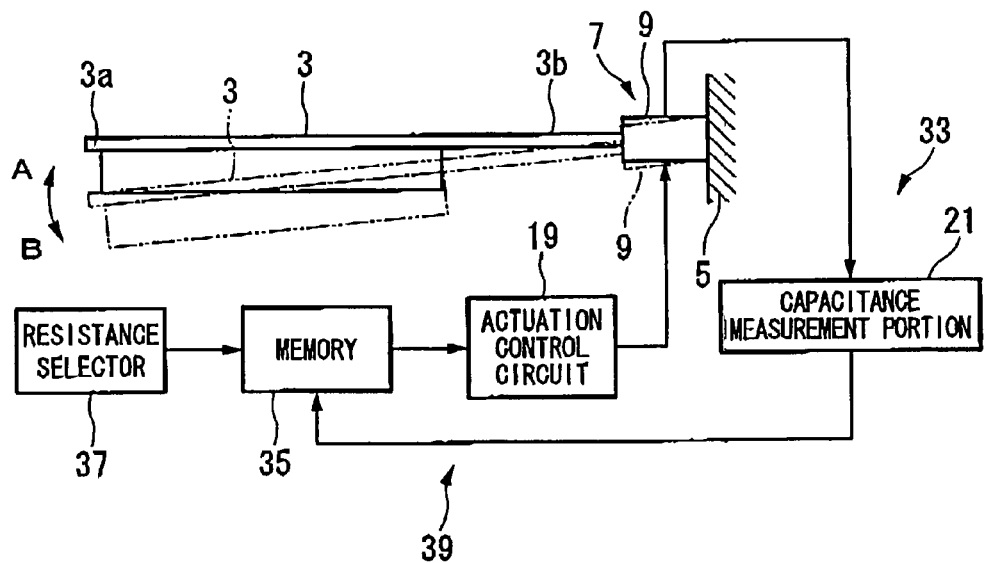
FIG. 1 is an outline constitutional drawing which shows a constitution of a key actuation control system of one embodiment of the present invention.

Hereinafter, referring to FIGS. 1-6, a key of one embodiment of the present invention is explained. As shown in FIG. 1, a key actuation control system 1 has a function of applying a reacting force when a player manually plays a keyboard musical instrument. The key actuation control system 1 is respectively attached to the keys 3 of the keyboard musical instrument.

A rear side 3b of the key 3 of the keyboard musical instrument is attached to a frame 5 via a polymer transducer 9 and is rotatably movable around an axis within a particular angle. The key 3 is attached to the frame 5 so as to be rotatably moved or pivot along directions of arrows A and B against the frame 5 by deforming the polymer transducer 9. Moreover, a spring is attached to the key 3 in order to return the key 3 to an initial position by applying a force to the key 3 along a direction of the arrow A. It should be noted that it is possible to return the key 3 to the initial position by using a returning force of the polymer transducer 9.

In other words, the keyboard musical instrument has a constitution in which the sound is generated according to a player who pushes a surface of a front side 3a of the key 3 in order to rotatably move the key 3 in a direction opposite to the direction A (that is, the direction B).

Figure 2:
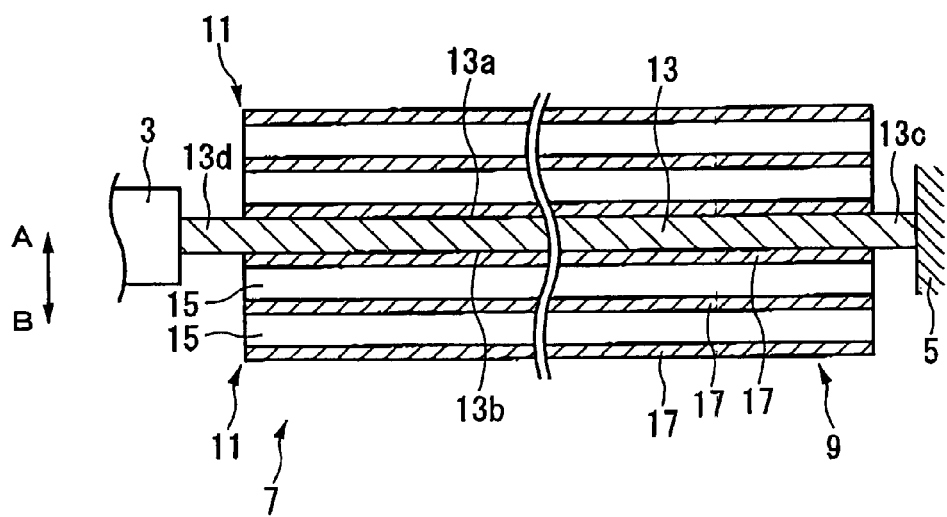
FIG. 2 is an outline cross-section of a polymer transducer-constituting the key actuation control system shown in FIG. 1.

The key actuation control system 1 has a key actuating apparatus 7 for actuating the key 3 in a rotatably moving direction. As shown in FIG. 2, the key actuating apparatus 7 is constituted from a polymer transducer 9 which is made by fixing polymer films (laminated bodies) 11 on both a front side surface 13a and a backside surface 13b of the plate shaped member 13.

The plate shape member 13 is, for example, made from a stainless steel plate, and is constituted so as to be curved by elastic deformation. The plate shaped member 13 has tow ends 13c and 13d along a surface direction. The end 13c is fixed to the frame 5 of the keyboard musical instrument, and the end 13d is fixed to the key 3. It should be noted that the modulus of elasticity of the plate shaped member 13 is higher than the modulus of elasticity of an elastomer film polymer film) 15 described below which constitutes the polymer film 1.

The polymer film 11 is formed so as to be substantially a plate shape by alternatively laminating electrodes 17 and elastomer films 15, in a manner in which a pair of electrodes 17 are arranged on both surfaces of the elastomer film (polymer film) 15 which is dielectric, elastically deformed and made from polymer material.

The elastomer film 15 is, for example, constituted from a polymer material such as a silicone resin and an acrylic polymer, obtained by forming so as to have a thickness of substantially 50 μm by using a spin-coater. Moreover, the electrode 17 is, for example, formed by spraying a solvent including carbon particles on both surfaces of the elastomer film 15.

Figure 3:
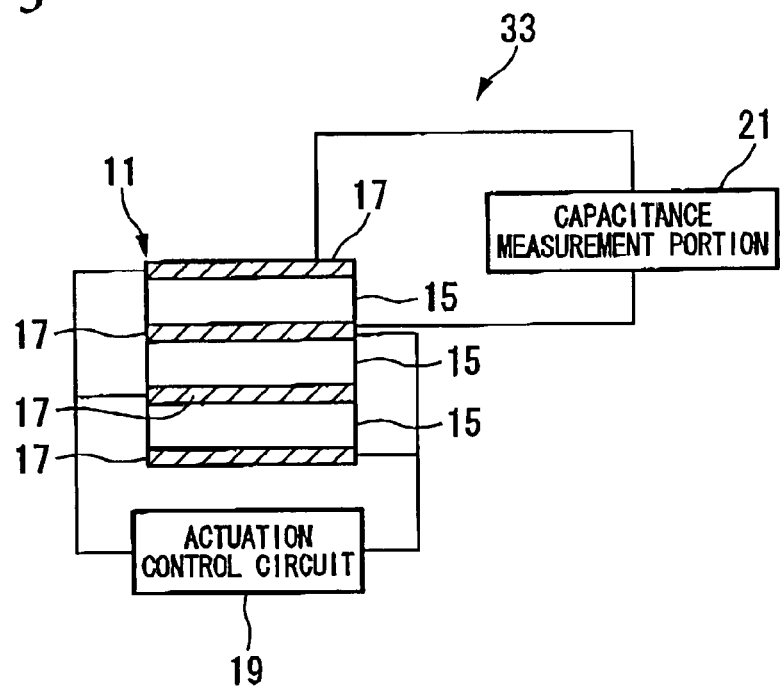
FIG. 3 is an outline cross-section of a polymer film, an actuation control circuit and a capacitance measurement portion which constitute the polymer transducer shown in FIG. 2.

As shown in FIG. 3, an actuation control circuit 19 which applies voltage between a pair of the electrodes 17 binding the elastomer film 15 is connected to the polymer film 11. The actuation control circuit 19 operates in order to switch between an application of voltage and a lack of voltage between a pair of the electrodes 17.

Figure 4:
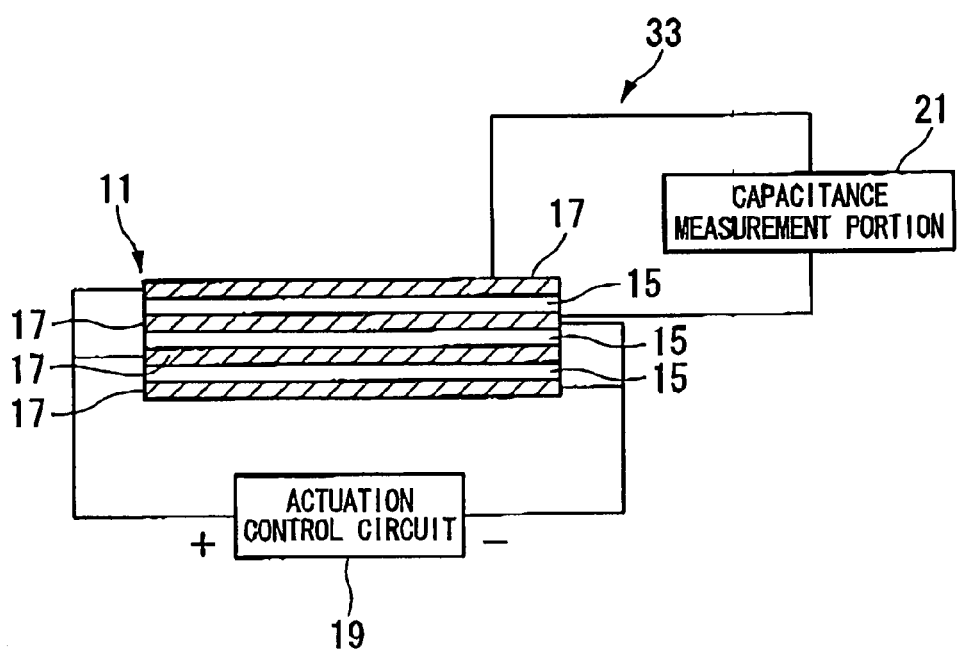
FIG. 4 is an outline cross-section of the polymer film shown in FIG. 3 to which voltage is applied.

When no voltage is applied between a pair of the electrodes 17, the polymer film 11 constituted in the above-described manner is in an initial state in which the elastomer film 15 is contracted in its surface direction. At his initial state, as shown in FIG. 4, if a voltage is applied between a pair of the electrodes 17, the elastomer film 15 is elastically deformed and extends in a surface direction because the elastomer film 15 is pressed in a thickness direction due to an electrostatic attraction caused between a pair of the electrodes 17. Moreover, at this extended state, as shown in FIG. 3, if a voltage which has been applied between a pair of the electrodes 17 is stopped, the elastomer film 15 contracts along the surface direction, that is, the elastomer film 15 returns to the initial state.

It should be noted that if the voltage applied between a pair of the electrodes 17 is larger, the above-described amount of extension of the elastomer film 15 in the surface direction is larger. Moreover, the polymer film 11 has a characteristic in which the polymer film 11 has a fast response speed with respect to extension and contraction corresponding to switching of applying and stopping of voltage applied between a pair of the electrodes 17.

As shown in FIG. 2, the polymer film 11 which has the above-described structure is fixed on the front side surface 13a and/or the backside surface 13b of the plate shaped member 13 while being electrically insulated. It should be noted that, as described in examples shown in the drawings, it is possible to fix the polymer film 11 to the plate shaped member 13 which is formed in a flat plate shape. Moreover, it is possible that the plate shaped member 13 be formed in a curved shape beforehand, and the polymer film 11 be fixed to the plate shaped member 13. Furthermore, it is possible to fix the polymer film 11 on one of the front side surface 13a and the backside surface 13b in a manner in which the elastomer film 15 is elastically extended in a direction from the edge 13c to the end 13d.

Regarding the polymer transducer 9 which has the above-described structure, for example, if a voltage is applied only between a pair of the electrodes 17 which are arranged on the backside surface 13b of the plate shaped member 13, only the backside surface 13b of the plate shaped member 13 extends along with extension of the elastomer film 15 in a surface direction. Therefore, an elastic deformation or curve is caused on the plate shaped member 13, and the end 13d rotatably moves in the direction A in relation to the end 13c of the plate shaped member 13. When the voltage applied between the electrodes 17 is stopped, the end 13d of the plate shaped member 13 rotatably moves in the direction B due to the elastic force of the elastomer film 15 and the plate shaped member 13.

Moreover, for example, if a voltage is applied only between a pair of the electrodes 17 which are arranged on the front side surface 13a of the plate shaped member 13, only the front side surface 13a of the plate shaped member 13 extends along with extension of the elastomer film 15 in a surface direction. Therefore, a deformation or curve is caused on the plate shaped member 13, and the end 13c rotatably moves in the direction B in relation to the end 13c of the plate shaped member 13. When the voltage applied between the electrodes 17 is stopped, the end 13d of the plate shaped member 13 rotatably moves in the direction A due to elastic force of the elastomer film 15 and the plate shaped member 13.

In other words, the polymer transducer 9 has a constitution in which the polymer transducer 9 is deformed according to extension and contraction of the elastomer film 15 caused in response to switching of the voltage applied between the pair of the electrodes 17. It is possible to rotatably move the key 3 in the directions A and B because of such the deformation. It should be noted that if the voltage applied between the electrodes 17 is larger, an actuating force for rotatably moving the key 3 is larger. Moreover, if the voltage applied between the electrodes 17 is smaller, an actuating force for rotatably moving the key 3 is smaller.

Moreover, as shown in FIGS. 1 and 3, the key actuation control system has a capacitance measurement portion 21 for measuring capacitance between the pair of the electrodes 17.

Figure 5:
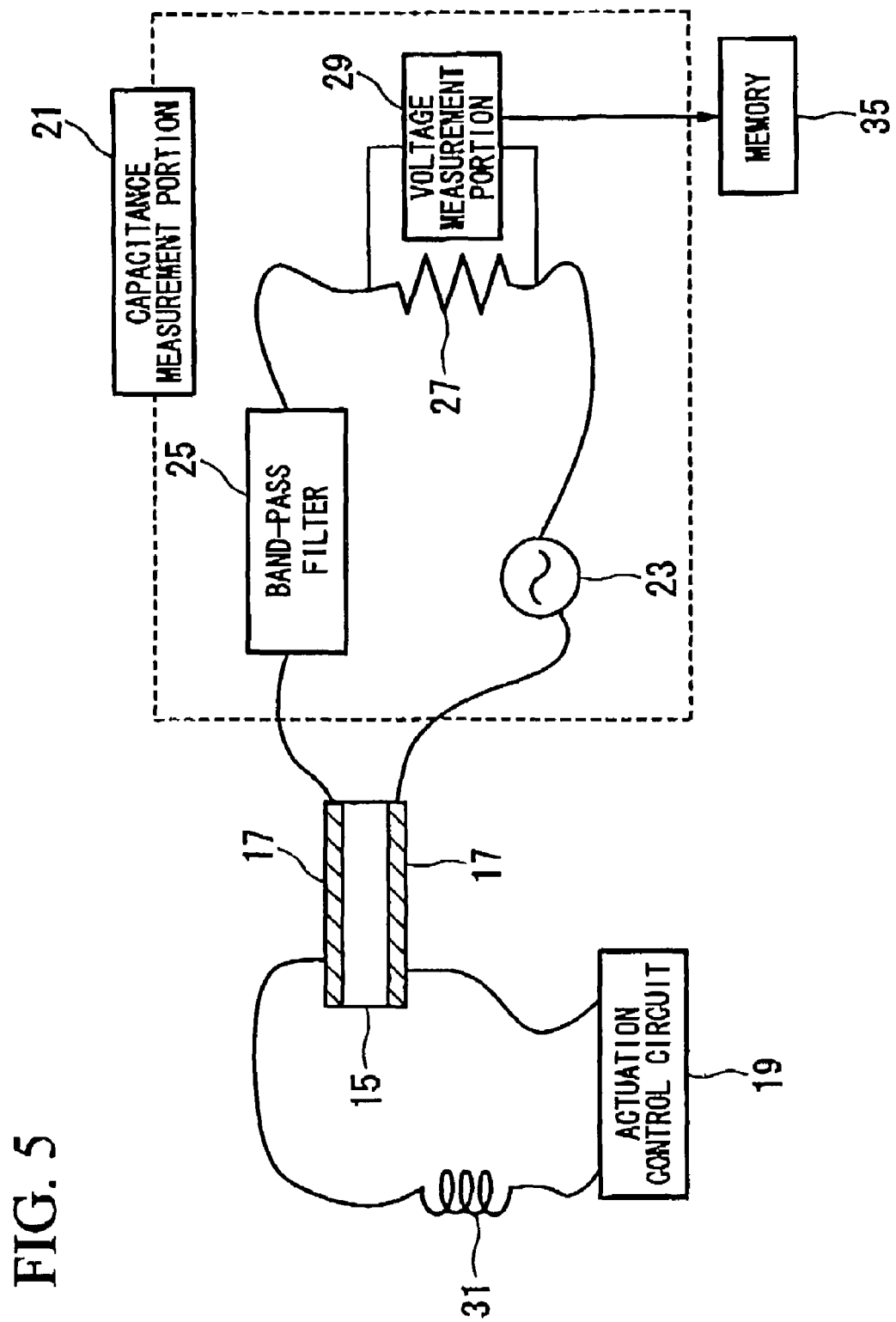
FIG. 5 is an outline constitutional drawing showing a concrete example of a capacitance measurement portion which constituters the key actuation control system shown in FIG. 1.

For example, as shown in FIG. 5, the capacitance measurement portion 21 has a constitution which includes: an oscillator 23 which generates 100 kHz AC current; a band-pass filter 25 which passes only 100 kHz current; an electric reactance 27 which is serially-connected to the pair of the electrodes 17; and a voltage measurement portion 29 which measures voltage of the electric reactance 27 while AC current is applied to the electric reactance 27. It should be noted that a pair of the above-described electrodes 17 are connected to the actuation control circuit 19 which is used for applying voltage. In order to prevent negative influence on operations of the actuation control circuit 19 because of AC current of the oscillator 23, a coil 31 which cancels an AC current of 100 kHz is provided between the actuation control circuit 19 and a pair of the electrodes 17. Moreover, electric current of the actuation control circuit 19 is prevented from being applied to circuits inside the capacitance measurement portion 21 by using the band-pass filter 25.

In other words, the capacitance measurement portion 21 is constituted so as to measure the capacitance between the pair of the electrodes 17 as voltage.

As described above, the polymer traducer 9 is deformed in response to rotatable movement of the key 3. When the polymer transducer 9 is deformed, a gap between the pair of the electrodes 17 is changed because the elastomer film 15 is extended or contracted in a surface direction. Therefore, there is a certain relationship between a position of the key 3 while rotatably moving and the gap between the pair of the electrodes 17, and it is possible to detect a position of the key 3 while rotatably moving according to a measured result of the capacitance between the electrodes 17 by using the capacitance measurement portion 21. That is, a position detection unit 33 for detecting a position of the key 3 while rotatably moving is constituted from the polymer transducer 9 and the capacitance measurement portion 21.

Moreover, as shown in FIG. 1, the key actuation control system 1 includes: a memory 35 to which detection results of the position detection unit 33 are recorded and which stores multiple resistance tables obtained by patterning resistance of the key 3; and a resistance selector 37 for selecting the resistance table stored in the memory 35.

In each of the resistance tables, a rotatably moving operation of the key 3 corresponds to reacting force applied to the key 3. The reacting force stored in the resistance table is determined and set in relation to elastic forces of the polymer transducer 9 and the spring. Here, velocity of the key 3, acceleration of the key 3, and the like calculated by the actuation control circuit 19 based on a position of the key 3 indicate rotatably moving operation of the key 3.

Other than the above-described resistance table to which the reacting force is set so as to obtain a resistance of the natural keyboard musical instrument such as an acoustic piano and a pipe organ, it should be noted that it is possible to provide various types of the resistance tables such as a table to which a smaller reacting force applied to the key is set.

It should be noted that the resistance selector 37 selects the resistance table corresponding to the key 3. In other words, for example, if two or more players simultaneously play the same keyboard musical instrument, that is, for example, four hands, it is possible to select the appropriate resistance table according to preference of each player by using the resistance selector 37.

Moreover, the above-described actuation control circuit 19 is constituted in a manner in which, when the position detection unit 33 detects the key 3 being manually and rotatably moved, the actuation control circuit 19 calculates a rotatably moving operation of the key 3, apply voltage between the electrodes 17 of the polymer transducer 9 based on the reacting force corresponding to the rotatably moving operation of the key 3 recorded in the predetermined resistance table, and control the applied voltage in order to adjust the actuation force so as to be the above-described reacting force.

In other words, the above-described action circuit 19 and the memory constitute a control unit 39 which, when the position detection unit 33 detects rotatable movement of the key 3, controls voltage applied between the electrodes 17 in order to cause the reacting force of the polymer transducer opposite to a direction of the rotatably moving operation of the key 3 based on the position of the key 3 while rotatably moving. It should be noted that in this embodiment, the control unit 39 controls the above-described applied voltage based on the capacitance measured by the capacitance measurement portion 21.

Next, operations of the key actuation control system constituted as described above are explained.

Figure 6:
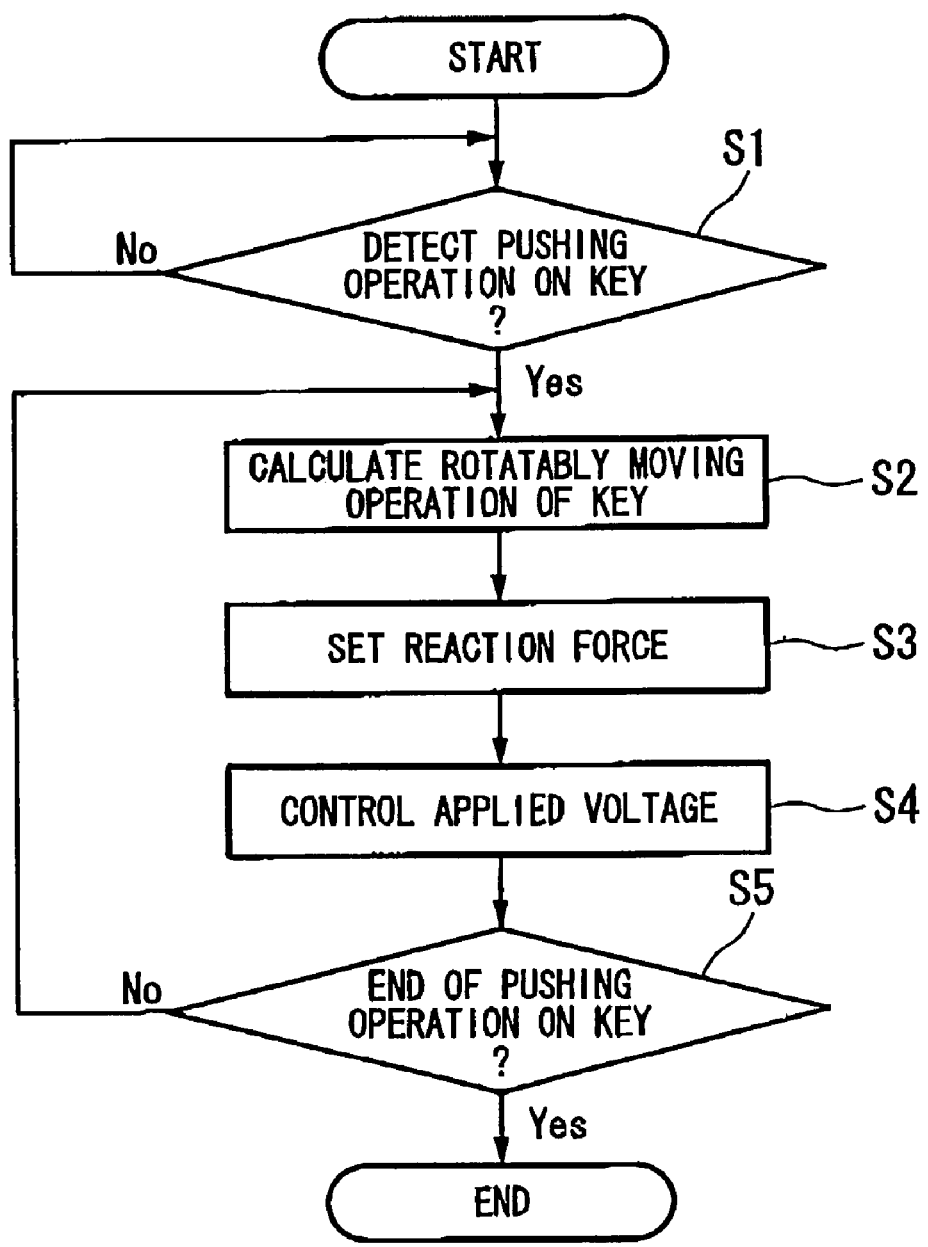
FIG. 6 is a flowchart showing an actuation control of a key by using the key actuation control system shown in FIG. 1.

First the player selects the resistance table which indicates patterns of preferable resistance by operating the resistance selector 37. In this state, as shown in FIG. 6, the control unit 39 detects whether or not the key 3 is manually and rotatably moved (operation of pushing the key) in the direction B based on the detection results of the position detection unit 33 (Step S1).

If it is detected that the key is pushed at Step S1, the control unit 39 calculates rotatably moving operation of the key 3 such as velocity and acceleration based on the position of the key 3 while rotatably moving (Step S2). Next, the control unit 39 refers to the resistance table and calculates the reacting force appropriate to the rotatably moving operation of the key 3 (Step S3). After that the control unit 39 controls the voltage applied between the electrodes 17 of the polymer transducer 9 in order to adjust the actuating force of the key 3 caused in accordance with operation of the actuation control circuit 19 so as to be the same as the above-described reacting force (Step S4). The key 3 is actuated in the direction A because of the applied voltage.

After Step S4, based on the detection results of the position detection unit 33, it is determined whether or not the manual pushing operation on the key is finished (Step S5). Here, the end of the pushing operation on the key is determined by checking whether or not the key 3 has returned to the initial position at which the key 3 was before the pushing operation. If it is determined that the pushing operation on the key is not finished at Step S5, the operation of Step S2 is repeated and the actuation control of the key 3 is continued. If it is determined that the pushing operation on the key has finished at Step S5, the actuation control of the key 3 by the key actuation control system 1 is completed.

It should be noted that it is possible to obtain advantages according to the above-described embodiment.

By using the key actuating apparatus 7 included in the above-described key actuation control system 1, the key 3, is actuated by the polymer transducer 9 which has a simple structure in which the pair of the electrodes 17 is arranged an both surfaces of the elastomer film 15. Therefore, it is possible to make the key actuating apparatus 7 light and small.

Moreover, the key actuating apparatus 7 is constituted from the polymer transducer 9 which has a simple structure. Therefore, compared to existing key actuating apparatuses, it is possible to apply a simpler structure for actuating to the key actuating apparatus 7, and it is possible to reduce the production cost for producing the key actuating apparatus 7.

Moreover, the polymer transducer 9 is constituted by fixing the polymer film 11 to the plate shaped portion 13 which has a higher modulus of elasticity than the elastomer film 15. Therefore, even if the modulus of elasticity of the elastomer film 15 is low, it is possible to maintain the shape of the polymer transducer 9.

Moreover, the polymer transducer 9 is constituted from both the polymer film 11 and the plate shaped portion 13. Therefore, it is possible to reliably cause the deformation of the polymer transducer 9.

Moreover, by using the above-described key actuation control system 1, when the pushing operation on the key is detected, the key 3 is actuated so as to rotatably move in a direction (direction A) opposite to a pushing direction (direction B) by the polymer transducer 9, and the reacting force is applied in opposition to the pushing operation on the key.

Therefore, even by using an electric keyboard musical instrument, it is possible to obtain the same touch as a natural keyboard musical instrument which provides an action mechanism.

Moreover, the reacting force in opposition to the pushing operation on the key is controlled in accordance with the voltage applied between the electrodes 17. Therefore, it is possible to accurately control the reacting force, and it is possible to obtain the same touch as a natural keyboard musical instrument even when playing an electric keyboard musical instrument.

Moreover, the same polymer transducer 9 has both a function of the key actuating apparatus 7 and the position detection unit 33. Therefore, it is possible to reduce the number of constitutional elements of the key actuation control system 1 and to further reduce the cost for producing the key actuation control system 1.

Moreover, in accordance with the above-described key actuation control system 1, it is possible to select various types of the resistance tables by using the resistance selector 37. Therefore, from, for example, a child unable to operate a key with sufficient force to an experienced player, it is possible to play the electrical keyboard musical instrument while applying preferable resistance for each player.

It should be noted that the above-described embodiment is not a limitation and it is possible to apply modifications and changes such as the following.

It should be noted that, other than applying the reacting force upon manual operation, it is possible to use the key actuation control system 1 of the above-described embodiment for, for example, an automatic operation. In this case, for example, it is possible to store music data for automatic operation in the memory 35. Here, the above-described music data indicates playing information including a series of musical sounds which constitute music. When an automatic playing is conducted, it is possible that the music data is read and output to the actuation control circuit 19, and the keys are actuated by the key actuating apparatus 7 in correspondence to the music. In this case, an actuation direction of the key 3 by the key actuating apparatus 7 is the same as the pushing direction of the key (direction B).

In the above descriptions, the polymer films 11 constituting the polymer transducer 9 are fixed on both the front side surface 13a and the backside surface 13b of the plate shaped member 13. However, this is not a limitation. In accordance with the direction in which the key 3 is actuated by the key actuating apparatus 7, it is possible to fix the polymer film 11 on at least one of the front side surface 13a and the backside surface 13b of the plate shaped member 13.

Figure 7:
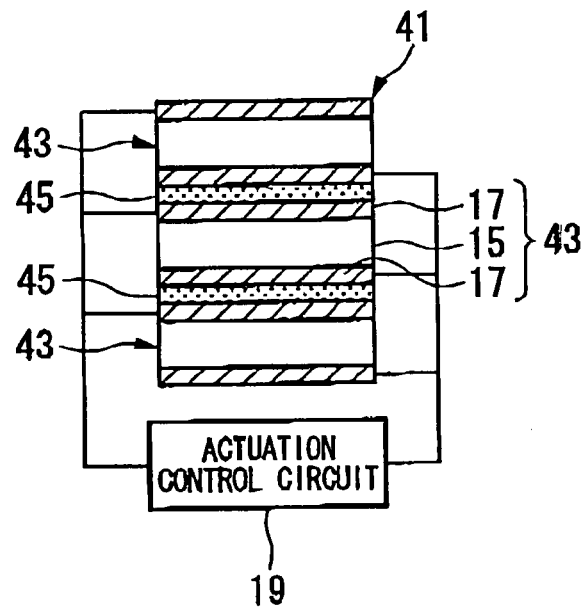
FIG. 7 is an outline constitutional drawing showing a polymer film of a key actuating system of another embodiment of the present invention.

Moreover, in the above descriptions, the polymer film 11 which is fixed on the front side surface 13a and/or the backside surface 13b of the plate shaped member 13 is constituted by alternately laminating both the multiple elastomer films 15 and the multiple electrodes 17. However, this is not a limitation. For example, as shown in FIG. 7, it is possible to constitute a polymer film (laminated body) 41 by arranging insulating films 45 made from an insulating material between units 43 which are made by arranging the pair of the electrodes 17 on both sides of one elastomer film 15.

Moreover, constitutions of the polymer films 11 and 41 are not limited to a constitution including both the multiple elastomer films 15 and the multiple electrodes 17. It is possible that the polymer films 11 and 41 are constituted from at least one elastomer film 15 on which the pair of the electrodes 17 is set on both sides. It should be noted that, in order to obtain sufficient force for deforming the plate shaped portion 13 and force for rotatably moving the key 3, it is preferable to apply constitutions including the multiple elastomer films 15 and the electrodes 17 as shown in the above-described embodiment and constitutions. As a concrete example, it is preferable to laminate 30-40 layers of the elastomer films 15.

Figure 8:
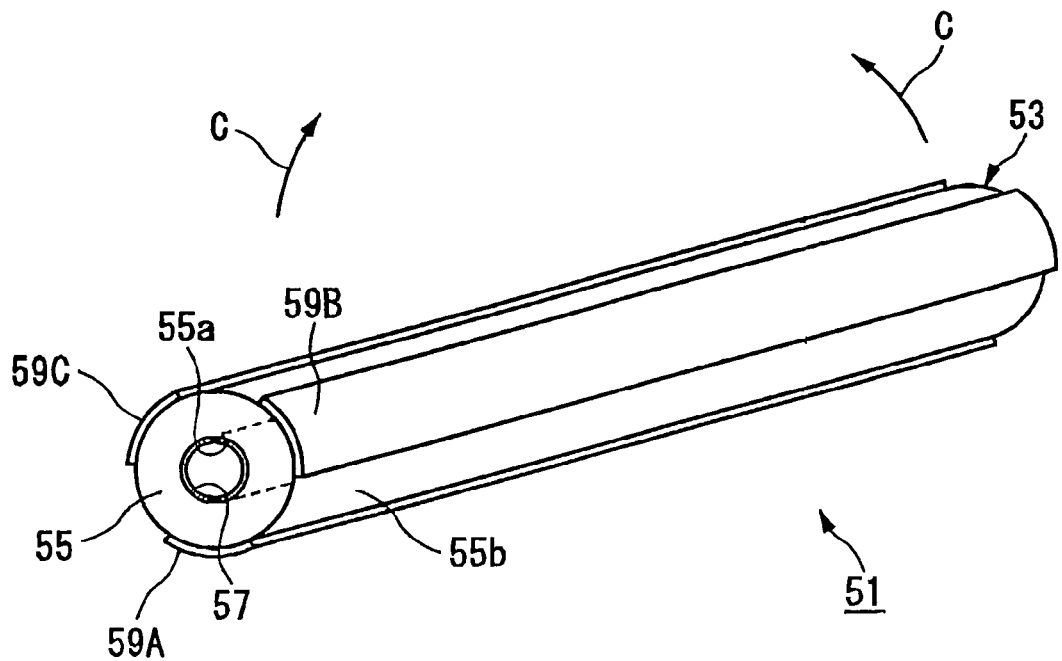
FIG. 8 is an outline constitutional drawing showing a polymer transducer of a key actuating system of another embodiment of the present invention.

Moreover, in the above-described embodiment, the polymer transducer 9 is constituted from both the polymer film 11 and the plate shaped portion 13. However, this is not a limitation. For example, as shown in FIG. 8, it is possible to constitute a polymer transducer 51 from only a polymer film 53, Regarding the polymer film 53, an elastomer film (polymer film) 55 is formed in a cylindrical shape and an electrode 57 which is one of anode or cathode is arranged on an overall inside surface 55a of the elastomer film 55. Moreover, multiple (3 in an example shown in the drawing) electrodes 59A-59C which are opposite terminals from the electrode 57 are arranged on an external surface 55b. In other words, the electrode 57 which is an anode/a cathode and the electrodes 59A-59C which are terminals opposite to the electrode 57 are facing while the elastomer film 55 in a width direction is in-between. It should be noted that the electrodes 59A-59C which are opposite terminals from the electrode 57 are arranged on the external surface 55b so as to obtain gaps along a circumference of the elastomer film 55.

Regarding the polymer transducer 51 which has the above-described constitution, for example, if the voltage is switched (between applying and stopping the voltage) between the electrode 57, which is an anode/a cathode, and the opposite electrode 59A arranged on a portion along a circumference of the elastomer film 55 so as to face the electrode 57, only a portion along a circumference of the elastomer film 55 extends or contracts. Therefore, it is possible to cause a deformation in a direction C on the polymer transducer 51 which is formed in a cylindrical shape.

Regarding the polymer transducer 51 which has the above-described constitution three electrodes 59A-59C which are opposite terminals from the electrode 57 are arranged on a circumference of an external surface 55b while having gaps among them. However, it should be noted that this is not a limitation. For example, it is possible to provide two electrodes which are opposite terminals from the electrode 57 so as to put the elastomer film 55 between the electrode 57 and the electrodes, or it is possible to provide only one electrode on a portion of a circumference of the elastomer film 55.

Moreover, in the above-described constitution, the capacitance measurement portion 21 provides the oscillator 23, the band-pass filter 25, the electric reactance 27 and the voltage measurement portion 29. However, this is not a limitation. It is possible to apply any other constitutions only if it is possible to measure the capacitance between the pair of the electrodes 17 which constitutes the polymer transducer 9.

Figure 9:
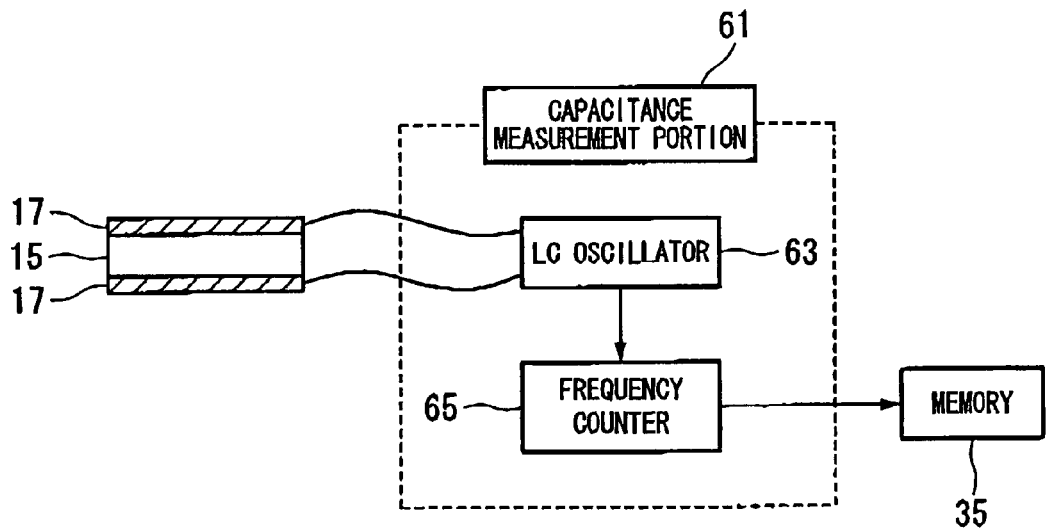
FIG. 9 is an outline constitutional drawing showing a concrete example of a capacitance measurement portion of a key actuation control system of another embodiment of the present invention.

For example, as shown in FIG. 9, it is possible that a capacitance measurement portion 61 has a constitution including: an LC oscillator 63 which is connected to the pair of the electrodes 17; and a frequency counter 65 for measuring the frequency generated by the LC oscillator 63. Here, the LC oscillator 63 is constituted so as to generate the resonance frequency determined in accordance with both an inductance of a coil which is provided inside the LC oscillator 63 and the capacitance of the pair of the electrodes 17. In a case of applying this constitution, the capacitance of the pair of the electrodes 17 changes according to a position of the key 3 while rotatably moving. Therefore, it is possible to detect the position of the key 3 while rotatably moving based on the above-described resonance frequency measured by using the frequency counter 65.

Figure 10:
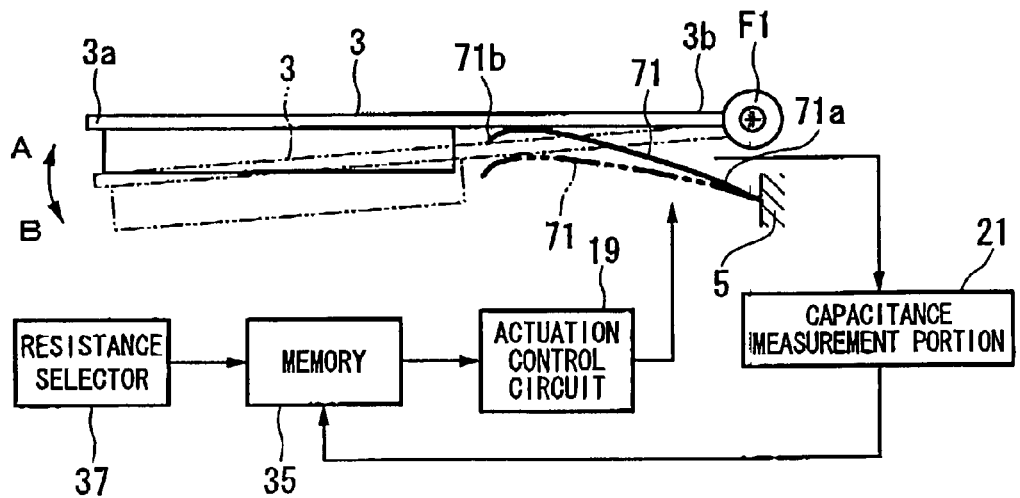
FIG. 10 is an outline constitutional drawing which shows a constitution of a key actuation control system of another embodiment of the present invention.

Moreover, the polymer transducer 9 is provided between the key 3 and the frame 5 so as to connect the key 3 and the frame 5. However, this is not a limitation. It is possible to provide the polymer transducer 9 at a position only if the key 3 is rotatably moved according to a deformation of the polymer transducer 9. Therefore, for example, as shown in FIG. 10, it is possible to arrange a polymer transducer 71 so as to have one end 71a which is fixed on the frame 5 and another end 71b touching a backside of the key 3. In the above-described constitution, as shown in the example of the drawing, it is possible to rotatably attach the key 3 in relation to the frame 5 while having the rear end 3b as a fulcrum F1. On the other hand, it is possible to directly attach the rear end 3b of the key 3 to the frame 5 in order to rotatably move the key 3 according to the deformation of the rear end 3b of the key 3.

It should be noted that, in a case of applying this constitution, if the keyboard musical instrument is automatically operated, it is preferable to fix the end 71b of the polymer transducer 71 on a backside surface of the key 3 because it is necessary to pull the key 3 in the direction B by using the polymer transducer 71.

Figure 11:
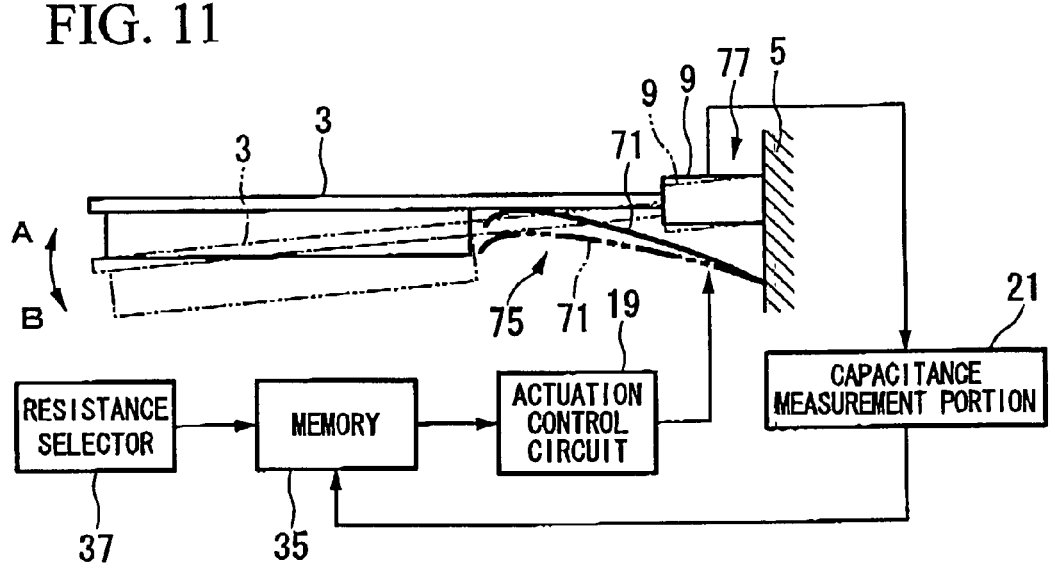
FIG. 11 is an outline constitutional drawing which shows a constitution of a key actuation control system of another embodiment of the present invention.

Moreover, in the above-described embodiment, both the key actuating apparatus 7 and the position detection unit 33 are constituted from the same polymer transducer 9. However, this is not a limitation. For example, as shown in FIG. 11, it is possible to separately constitute the key actuating apparatus 7 and the position detection unit 33 by applying the polymer transducer 9 and the polymer transducer 71.

In other words, as shown in the example of the drawing, it is possible to detect a position of the key 3 while rotatably moving key by using the polymer transducer 9 which connects the key 3 to the frame 5 while the key is rotatably moved by using the polymer transducer 71 which touches a backside surface of the key 3. Conversely, it is possible to actuate the key 3 by using the polymer transducer 9 while detecting the position of the key 3 while rotatably moving by using the polymer transducer 71.

Moreover, in the above-described embodiment, the position detection unit 33 is constituted from the polymer traducer 9 and the capacitance measurement portion 21. However, this is not a limitation and it is possible to apply a constitution only if it can measure the position of the key 3 while rotatably moving. Therefore, it is possible to constitute the position detection unit 33 from such as an optical sensor, a magnetometric sensor and a strain gauge.

Figure 12:
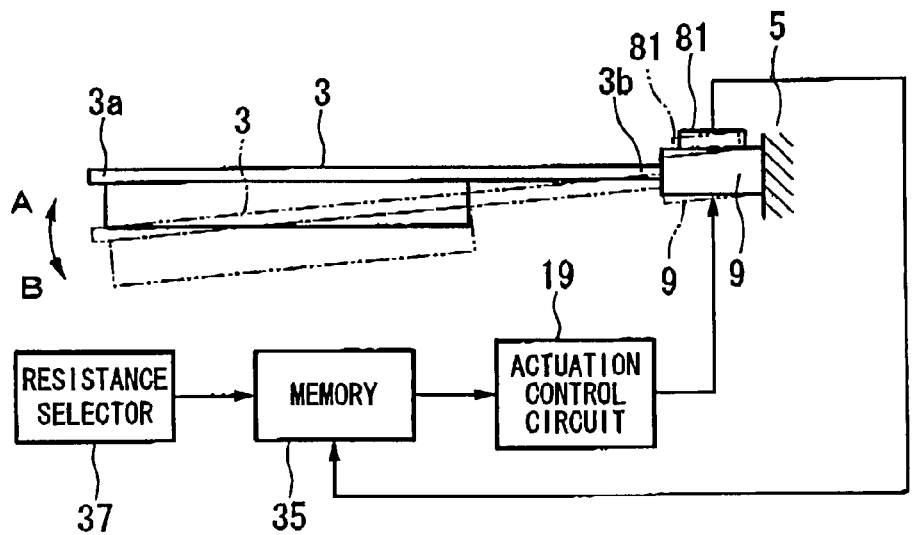
FIG. 12 is an outline constitutional drawing which shows a constitution of a key actuation control system of another embodiment of the present invention.
Figure 13:
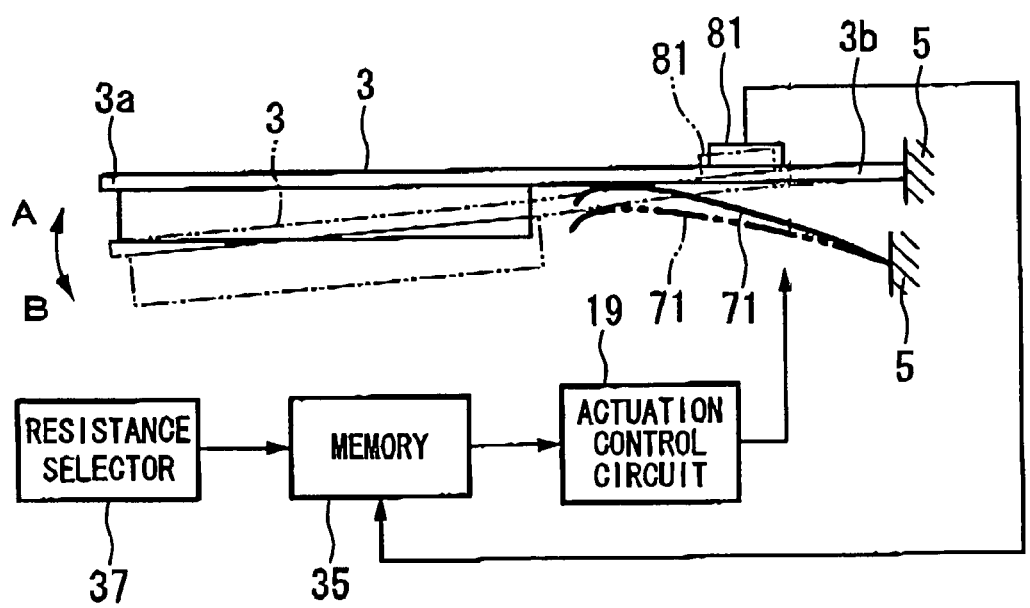
FIG. 13 is an outline constitutional drawing which shows a constitution of a key actuation control system of another embodiment of the present invention.

If a strain gauge is used, for example, as shown in FIG. 12, it is possible to fix a strain gauge (position detection unit) 81 on the polymer transducer 9 which connects the key 3 to the frame 5. Moreover, for example, as shown in FIG. 13, in a case in which the rear end 3b of the key 3 is directly fixed to the frame 5 in order to rotatably move the key 3 according to deformation of the rear end 3b of the key 3, it is possible to fix the strain gauge 81 at the rear end 3b of the key 3.

While preferred embodiments of the invention have bees described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as bring limited by the foregoing description, and is only limited by the scope of the appended claims.

What is claimed is:

1. A key actuation control system comprising:
   key actuating apparatus which actuates a key rotatably supported with respect to a frame comprising a polymer transducer for rotatably moving the key by using a deformation of the polymer transducer,
      wherein the polymer transducer is substantially formed in a plate shape and comprises:
         a polymer film which is dielectric and made from an elastically deformable polymer material; and
         a pair of electrodes arranged at both sides of surfaces of the polymer film, and
      wherein the transducer is deformed corresponding to switching between an application of voltage and a lack of voltage between the electrodes,
   a position detection unit detecting a position of the key while rotatably moving;
   a control unit actuating the key by controlling the applied voltage between the electrodes in order to cause a reaction force of the polymer transducer in an opposite direction to a rotatably moving operation of the key when the position detection unit detects rotatable movement of the key due to a manual operation;
   wherein the position detection unit comprises:
      the polymer transducer; and
      a capacitance measurement portion measuring a capacitance between the electrodes, and
   the control unit controls the applied voltage between the electrodes based on the measured capacitance.

* * * * *